(12) United States Patent
Kroth et al.

(10) Patent No.: US 12,411,663 B2
(45) Date of Patent: *Sep. 9, 2025

(54) NOTEBOOK FOR NAVIGATING CODE USING MACHINE LEARNING AND FLOW ANALYSIS

(71) Applicant: Microsoft Technology Licensing, LLC, Redmond, WA (US)

(72) Inventors: Brian Paul Kroth, Madison, WI (US); Jordan Joseph Henkel, Madison, WI (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/481,916

(22) Filed: Oct. 5, 2023

(65) Prior Publication Data

US 2024/0028307 A1 Jan. 25, 2024

Related U.S. Application Data

(63) Continuation of application No. 17/099,720, filed on Nov. 16, 2020, now Pat. No. 11,816,456.

(51) Int. Cl.
*G06F 8/33* (2018.01)
*G06F 8/30* (2018.01)
(Continued)

(52) U.S. Cl.
CPC .................. *G06F 8/33* (2013.01); *G06F 8/30* (2013.01); *G06F 8/44* (2013.01); *G06F 8/75* (2013.01);
(Continued)

(58) Field of Classification Search
CPC ..... G06F 8/30; G06F 8/33; G06F 8/44; G06F 8/70; G06F 8/71; G06F 8/75; G06F 9/451;
(Continued)

(56) References Cited

U.S. PATENT DOCUMENTS

2010/0169871 A1 7/2010 Villadsen
2012/0254835 A1* 10/2012 Muddu .................... G06F 8/75
717/121

(Continued)

OTHER PUBLICATIONS

Luan, Sifei, et al., Aroma: code recommendation via structural code search, Proceedings of the ACM on Programming Languages, 2019, 28 pages, [retrieved on Oct. 3, 2024], Retrieved from the Internet: <URL:http://dl.acm.org/>.*

(Continued)

*Primary Examiner* — Geoffrey R St Leger
(74) *Attorney, Agent, or Firm* — Barta Jones, PLLC

(57) ABSTRACT

A code notebook and backend cloud service are configured to intelligently analyze program source code that a developer wants analyzed. A user drafts a code query to be answered about the source code that may specify specific variables, code structure elements, and/or program flows to be scrutinized. A cloud-computing environment builds a code database of the source code and analyzes its text, code structures, and program flows-using. The code database is embedded with indications of semantic equivalence for text in the source code, identifications of different code structural elements, and program flows. In the cloud-computing environment, a query service takes the code query of the developer and queries the database with machine-learned embeddings, generating query results that are shared with the developer and shown in a representation of the source code.

20 Claims, 10 Drawing Sheets

(51) Int. Cl.
  *G06F 8/41* (2018.01)
  *G06F 8/75* (2018.01)
  *G06F 9/445* (2018.01)
  *G06F 9/451* (2018.01)
  *G06F 9/54* (2006.01)
  *G06F 16/23* (2019.01)
  *G06N 5/04* (2023.01)
  *G06N 20/00* (2019.01)

(52) U.S. Cl.
  CPC .......... *G06F 9/44526* (2013.01); *G06F 9/451* (2018.02); *G06F 9/541* (2013.01); *G06F 16/2379* (2019.01); *G06N 5/04* (2013.01); *G06N 20/00* (2019.01)

(58) Field of Classification Search
  CPC .. G06F 9/44526; G06F 9/541; G06F 16/2379; G06N 20/00; G06N 5/04
  See application file for complete search history.

(56) References Cited

U.S. PATENT DOCUMENTS

| | | | | |
|---|---|---|---|---|
| 2015/0046492 A1* | 2/2015 | Balachandran | ........... | G06F 8/36 707/772 |
| 2020/0104631 A1* | 4/2020 | Zhang | ..................... | G06F 40/30 |
| 2020/0117446 A1 | 4/2020 | Smith | | |
| 2020/0125996 A1 | 4/2020 | Paparaju | | |
| 2022/0138240 A1* | 5/2022 | Bahrami | ............. | G06F 16/3332 717/120 |

OTHER PUBLICATIONS

Kim, Kisub, et al., FaCoY—A Code-to-Code Search Engine, ICSE '18: Proceedings of the 40th International Conference on Software Engineering, May 2018, 12 pages, [retrieved on Oct. 3, 2024], Retrieved from the Internet: <URL:http://dl.acm.org/>.*
Communication pursuant to Article 94(3) EPC, Received for European Application No. 21802043.6, mailed on Mar. 5, 2024, 03 pages.
Applicant Initiated Interview Summary Issued in U.S. Appl. No. 17/099,720, dated Oct. 13, 2022, 2 pages.
Applicant Initiated Interview Summary Issued in U.S. Appl. No. 17/099,720, dated Jun. 7, 2022, 2 pages.
Final Office Action Issued in U.S. Appl. No. 17/099,720, dated Aug. 12, 2022, 32 pages.
Non-Final Office Action Issued in U.S. Appl. No. 17/099,720, dated Mar. 31, 2022, 32 pages.
Non-Final Office Action Issued in U.S. Appl. No. 17/099,720, dated Jan. 5, 2023, 40 pages.
Office Action Received for European Application No. 21802043.6, mailed on May 3, 2024, 5 pages.
Communication under Rule 71(3) Received in European Patent Application No. 21802043.6, mailed on Oct. 22, 2024, 06 pages.
Decision to grant a European patent pursuant to Article 97(1) Received in European Patent Application No. 21802043.6, mailed on Feb. 27, 2025, 02 pages.
Extended European search report received for European Application No. 25162070.4, mailed on Jun. 23, 2025, 10 pages.

* cited by examiner

NOTEBOOK FOR NAVIGATING CODE USING MACHINE LEARNING AND FLOW ANALYSIS

CROSS-REFERENCE TO RELATED APPLICATION

This application is a continuation application of and claims priority to U.S. patent application Ser. No. 17/099,720, entitled "NOTEBOOK FOR NAVIGATING CODE USING MACHINE LEARNING AND FLOW ANALYSIS," filed on Nov. 16, 2020, the disclosure of which is incorporated herein by reference in its entirety.

BACKGROUND

Like so many professions, software development is full of unique niches. Programming, as a discipline and skill, is only the foundation of modern software development. There are numerous other sub-disciplines for which a working knowledge of programming is just a prerequisite. For instance, machine-learning, artificial intelligence, and development operations (DevOps) experts are most likely experts in their respective field but rarely the most adept programmers. Bringing expert concepts to life through program code is frequently limited to the ability of the experts to code or express their ideas to those who can. This provides quite the strain on developing the most sophisticated software because the experts are limited to either their knowledge base for programming or the knowledge base of their developers or constrained by time—i.e., spending time on getting up to speed with the most cutting-edge techniques for coding comes at an opportunity cost. The code requisite for implementing a particular concept or idea is often not immediately obvious to an expert. While the expert may search developed code, traditional search tools, again, require the expert to know exactly what to look for—e.g., the exact variable, type, or routine names that to find. In large programs, that is nearly impossible without firsthand knowledge.

Software programming is a complex endeavor that requires expert skill and, often, collaboration with other programmers. For example, an operating system (OS) may comprise thousands of lines of code that are written by different developers. Source code may be written any number of ways with different defined variables, routines, and other components, making it complex for even one developer, let alone many. Developers need robust tools to quickly search and find different parts of the program.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

Examples and embodiments disclosed herein are directed to a code notebook and backend cloud service configured to intelligently analyze program source code that a developer wants analyzed, targeted, or indexed. The source code being analyzed, targeted, or indexed is uploaded to a cloud-computing environment, where a code database of the source code is built and used for querying the source code. The code database is augmented with the results of various machine-learning models applied to the target code. These machine-learning models seek to capture and encode the underlying semantics and structures of the target source code. Also, embodiments are able to run a flow analysis for a particular type of operational analyses and store the result in the code database for querying. The code notebook resides as an application on a client computing device and includes APIs that allow the user to draft and submit code queries using fuzzy logic about variables, types, data, code structure, and program flows to be searched. These code queries are submitted against the code database in the cloud-computing environment, and query results are returned to the client computing device of the developer. The code notebook also includes a representation of the source code being queried, and the query results are visually identified in this representation.

BRIEF DESCRIPTION OF THE DRAWINGS

The disclosed examples are described in detail below with reference to the accompanying drawing figures listed below:

FIG. 4 illustrates a user interface (UI) of a code notebook being used for submitting code queries and viewing query results, according to some of the disclosed embodiments;

FIG. 5B illustrates a UI of a code notebook being used for submitting code queries and viewing query results, according to some of the disclosed embodiments;

DETAILED DESCRIPTION

Figure 1:
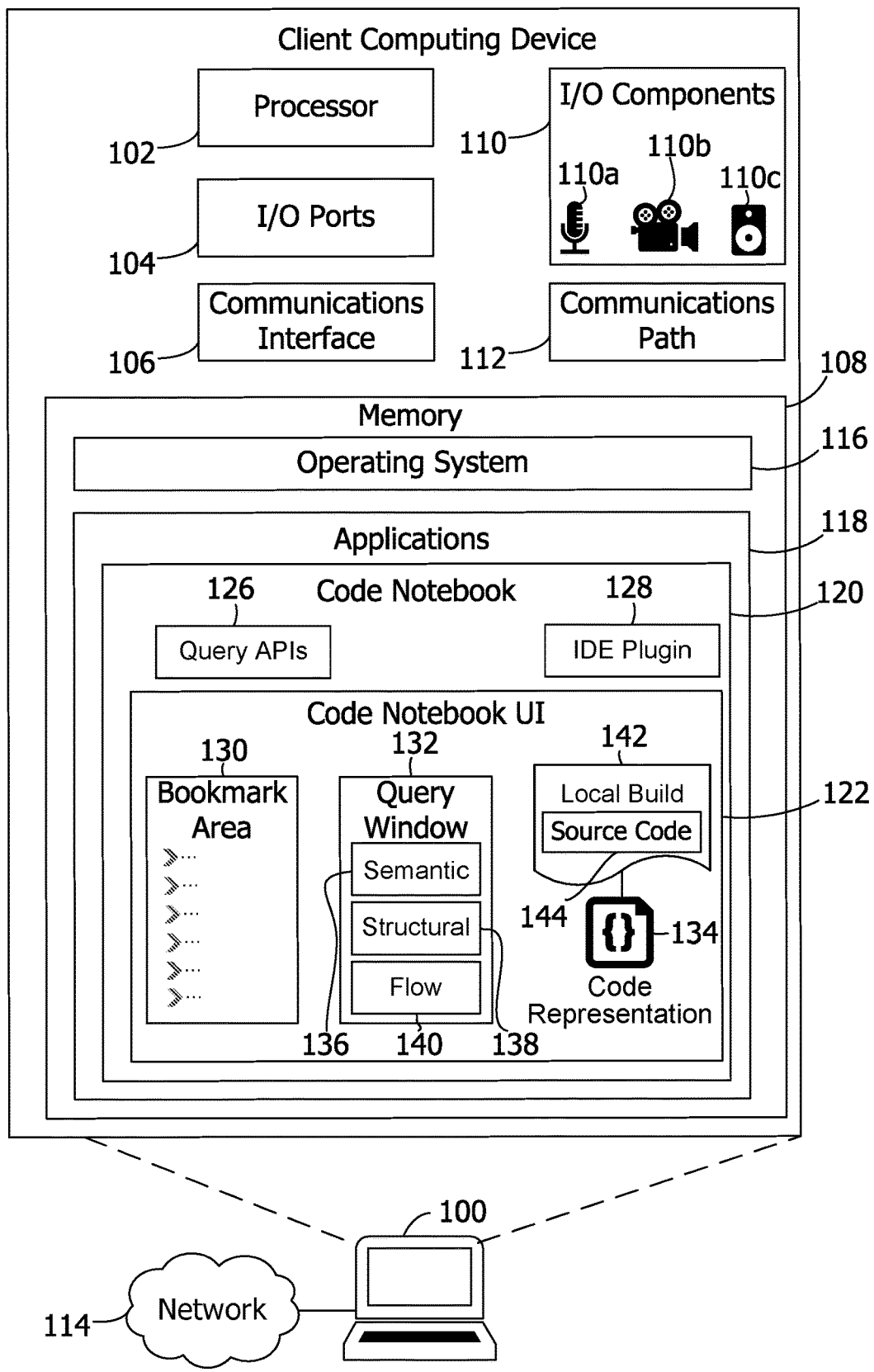
FIG. 1 illustrates a block diagram of a client computing device configured to provide a code notebook for querying source code, according to some of the disclosed embodiments.

The various embodiments will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

Similarly, traditional tools for analyzing source code generally require users to specify exact and precise constraints on program flows or program structure. Generally, there are two ways that source is analyzed: through code analysis tools, and through human inspection tools. Conventional code analysis tools today provide a programmatic way of finding certain poor coding patterns in source code and then emit warnings about them. Conventional human inspection tools allow a user to interact with the source code are limited in their searching functions to only include exact textual matches to user search queries, or possibly regular-expression matching. For example, a user provides text to be searched, and traditional search features look for that exact text in the source code. A user may search for different instances of a particular variable by typing the variables name and hitting a search feature. Such searching requires the user to correctly type in the variable name, and the results only identify instances of the exact search term the user typed. Today's human inspection tools do not provide semantic nor structure searching. Traditional analysis tools are either limited to searching for poor coding patterns or often suited only to expert users (developers) who know exactly what text to search.

The embodiments and examples disclose a code notebook that enables a user to conduct semantic, structural, and/or programming-flow queries on program source code. The code notebook provides a UI on a client computing device with a query window for a user to submit different code queries, a representation area showing the program source code in which query results are identified, and a bookmark area that allows the user to quickly navigate to different portions of the source code where the query results are identified. These three UI portions allow the user to quickly submit queries and view the query results in the program source code, without having to know the exact terminology used.

In some embodiments, the user uploads program source code to a cloud-computing environment (or "cloud") where the source code is analyzed, augmented, and made queryable (or searchable) by the disclosed code notebook. A fluent query API allows developers to compose code queries in the client-side UI of the code notebook. Machine-learning extensions allow for fuzzy constraints to be submitted by the user and semantically expanded to locate similar query terminology in the source code. For instance, a user may query for instances of the variable "settings" in source code using the machine-learning extensions, and embodiments are able to locate semantically similar variables "options," "configurations," "config," or the like—without the user having to specific those variables. Moreover, the disclosed code notebook also allows the user to query the source code for particular code structures (e.g., for loops, if/then statements, etc.) and/or programming-flow analyses (e.g., variable A that is used to generate a different variable B). Allowing the user to query their source code using a combination of fuzzy semantics, code structure, and programing-flow provides robust analytical tools to the user directly in the code notebook.

In particular, the semantic searches allow the user to query terms in the source code, and the disclosed embodiments look not only for those search terms but also for semantically similar terms that are also in the source code. "Semantic searches," as disclosed herein, refer to searches for specific query terms provides by a user (e.g., a variable name) and also synonymous query terms that are determined to be semantically equivalent to the query terms through machine learning of larger data sets. These searches are deemed to be "fuzzy" because they include a first set of text ("find String ABC") but are expanded to search for semantically equivalent text ("String XYZ"). In some embodiments, this semantic equivalence is performed using a machine learning service that learns latent spaces of vectors (embeddings). In this latent space, semantically equivalent (synonymous) words are close together and dissimilar words are far apart. This latent space is generated by learning from large data sets, such as the World Wide Web. Thus, in some embodiment, the semantic equivalency (or similarity) is, more generally, encoded by distances in a learned latent space. This learned space is not, in general, includes encoding synonymous words with nearby vectors, as well as other relationships between text. For example, if a user searches for all namespaces named "settings," the disclosed embodiments will also show the user instances of namespaces "options," "configurations," or other types of similar namespaces—and without the user having to specify anything than the original search terms. In other words, the search that the user initiated is automatically expanded, through distances in the latent space of vectors (embeddings, to include terms that may have the same meaning as the user's search terms—as determined through machine learning.

The structural queries allow the user to query and locate various structural constraints in source code. "Structural queries," as disclosed herein, refer to the structure of the source code, otherwise referred to as the "structural code elements." Examples of structural code elements include, without limitation, specific declarations, code operations (e.g., for loops, if/then statements, while loops, or the like); operational counts (e.g., number of times code is declared, databases are accessed, etc.); and the like. In some embodiments, the structural queries are executed by locating the strict constraints entered by the user. For example, if the user queries the number of times a variable (semantic query) is run in a for loop (structural query), the source code is analyzed for the number of times that variable and its semantic equivalents are found in for loops—the former being a fuzzy search for semantically equivalent text (as determined, in some embodiments, through latent spaces and vectors) while the latter is a strict search for code structure.

Some of the disclosed embodiments use a plugin to a compiler frontend to extract information during compilation of the source code. This extracted compiler information is outputted to a relational database using a Merkel-Tree-style hashes to uniquely identify different elements across projects and compiler translation units (or stages). Machine-learning embeddings are added to the created database of the source code to enable efficient querying for relevant data using semantic and structural flow searches inside the database.

The program flow analyses allow the user to query and locate different program flows. "Program flows," "program flow analyses," and "flow queries," as disclosed herein, refer to the operational workflows for assigning variable A to another variable B, using variable B as an argument to a function call "foo(B)," and then identifying the relationship between function call foo and A (as A flowed into B and then into foo(. . . )). For example, in the following code "Anonymous" is originally assigned to string A, but different operations reassign A to various values that are returned:

```
public string name (String type) {
    String A = "Anonymous";
    if(type.equals("cat"))
        A = "Garfield";
    else if(type.equals("dog"))
        A = "Snoopy";
    else
        A = "Blob";
    return A;
}
```

The relationship between Anonymous and A is identified as an workflow operation. Some embodiments use externally defined analyses (not limited to flow analyses) encoded in datalogs. These external datalog analyses are applied against the cloud database created from program source code to augment the source code database with information produced by the datalog analyses (such as program flow information).

Embodiments allow the user to upload source code to a cloud-computing environment, where it is ingested and used to create a code database that may be queried. Using the disclosed tools, the user may submit fuzzy queries consisting of semantic searches, either alone, or in combination with structural queries. The text of the semantic searches may be expanded to capture semantic equivalences, and the structural searches may be used to identify particular code operations.

Additionally, the source code is analyzed to understand—or machine learn—its program flows. These program flow may be organized in one or more tree structures that designate how variables and operations are interrelated in the source code. Some embodiments use these uncovered flow operations to expand the semantic searches beyond just the query text and its semantic equivalence to also include ending other non-semantically equivalent variables and operations that use, depend on, or are otherwise programmatically related to the query text and its semantic equivalence. Following the aforementioned example, if a user searches for "settings" in "for loops," embodiments query for such text and structure but may also find out that the semantic equivalent variable "options" is used in an operation that produces a resultant variable called "WindowSize," which is not semantically equivalent to settings but nevertheless is impacted by the settings variable. Some embodiments take this into account and include the WindowSize variable in the query results that are shown to the user—either with or without the user specifically requesting such expansion. Thus, the program flow analyses described herein provide a way to expand the code queries beyond mere semantics and structure to cover the program flows of the source code.

Additionally, this disclosure refers to "program source code" and "source code" interchangeably. Both phrases mean the same thing in this disclosure, namely program instructions that have been written in a programming language (e.g., C, C++, Java, etc.).

Having generally provided an overview of some of the disclosed examples, attention is drawn to the accompanying drawings to further illustrate some additional details. The illustrated configurations and operational sequences are provided to aid the reader in understanding some aspects of the disclosed examples. The accompanying figures are not meant to limit all examples, and thus some examples may include different components, devices, or sequences of operations while not departing from the scope of the disclosed examples discussed herein. In other words, some examples may be embodied or may function in different ways than those shown.

FIG. 1 illustrates a block diagram of a client computing device 100 configured to provide a code notebook for querying source code, according to the disclosed embodiments. Client computing device 100 includes one or more processors 102, input/output (I/O) ports 104, a communications interface 106, computer-storage memory (memory) 108, I/O components 110, and a communications path 112. The client computing device 100 is able to communicate over a network 114 with other devices, such as the disclosed cloud-computing resources.

The client computing device 100 may be any of several types of computing device, such as, for example but without limitation, a laptop, smartphone, tablet, virtual reality (VR) or augmented reality (AR) headset, or the like. While the client computing device 100 is depicted as a single device, multiple client computing devices 100 may work together and share the depicted device resources. For instance, various processors 102 and memory 108 may be housed and distributed across multiple client computing devices 100. The client computing device 100 is but one example of a suitable computing environment and is not intended to suggest any limitation as to the scope of use or functionality of the invention.

The processor 102 includes any number of microprocessors, microcontrollers, graphics programming units (GPUs), central processing units (CPUs), quantum processing units (QPUs), analog circuitry, or the like for that are programmed to execute computer-executable instructions for implementing aspects of this disclosure. In some examples, the processor 102 is programmed to execute instructions such as those illustrated in the other drawings discussed herein. In some implementations, the processor 102 is programmed with instructions to function for the specialized purpose of providing a code notebook that allows a user to enter a query about program source code to be executed in the cloud and then see resultant query results.

The I/O ports 104 connect various hardware I/O components 110 to the client computing device 100. Example I/O components 110 include, for example but without limitation, one or more microphones 110a, cameras 110b, and speakers 110c that operate to capture and present audio/visual content. The client computing device 100 may additionally or alternatively be equipped with other hardware I/O components 110, such as, for example but without limitation, displays, touch screens, AR and VR headsets, peripheral devices, joysticks, scanner, printers, etc. Such components are well known to those in the art and need not be discussed at length herein.

The communications interface 106 allows software and data to be transferred between the client computer device 100 and external devices over the network 114. The communications interface 106 may include a modem, a network interface (such as an Ethernet card), a communications port, a Personal Computer Memory Card International Association (PCMCIA) slot and card, a wireless adapter, etc. Software and data transferred via the communications interface 106 are in the form of signals that may be electronic, electromagnetic, optical, or other signals capable of being received by communications interface 106. Such signals are provided to the communications interface 106 via the communications path (e.g., channel) 112. The communications path 112 carries the signals and may be implemented using a wired, wireless, fiber optic, telephone, cellular, radio frequency (RF), or other communications channel.

The network 114 may include any computer network or combination thereof. Examples of computer networks configurable to operate as network 114 include, without limitation, a wireless network; landline; cable line; digital subscriber line (DSL): fiber-optic line; cellular network (e.g., 3G, 4G, 5G, etc.); local area network (LAN); wide area network (WAN):, metropolitan area network (MAN); or the like. The network 114 is not limited, however, to connections coupling separate computer units. Rather, the network 114 may also comprise subsystems that transfer data between servers or computing devices. For example, the network 114 may also include a point-to-point connection, the Internet, an Ethernet, an electrical bus, a neural network, or other internal system. Such networking architectures are well known and need not be discussed at depth herein.

The computer-storage memory 108 includes any quantity of memory devices associated with or accessible by the client computing device 100. The computer-storage memory 108 may take the form of the computer-storage media referenced below and operatively provides storage of computer-readable code, data structures, program modules, and other code for the client computing device 100 to store and access instructions configured to carry out the various operations disclosed herein. The computer-storage memory 108 may include memory devices in the form of volatile and/or nonvolatile memory, removable or non-removable memory, data disks in virtual environments, or a combination thereof. Examples of client computing device 100 include, without limitation, random access memory (RAM); read only memory (ROM); electronically erasable programmable read only memory (EEPROM); flash memory or other memory technologies; CDROM, digital versatile disks (DVDs) or other optical or holographic media; magnetic cassettes, magnetic tape, magnetic disk storage or other magnetic storage devices; memory wired into an analog computing device; or any other computer memory.

The computer-storage memory 108 may be internal to the client computing device 100 (as shown in FIG. 1), external to the client computing device 100 (not shown), or both (not shown). Additionally or alternatively, the computer-storage memory 108 may be distributed across multiple client computing devices 100 and/or servers, e.g., in a virtualized environment providing distributed processing. For the purposes of this disclosure, "computer storage media," "computer-storage memory," "memory,"and "memory devices" are synonymous terms for the computer-storage media 108, and none of these terms include carrier waves or propagating signaling.

In some examples, the computer-storage memory 108 stores executable computer instructions for an operating system (OS) 116 and various software applications 118. The OS 116 may be any OS designed to control the functionality of the client computing device 100, including, for example but without limitation: WINDOWS® developed by the MICROSOFT CORPORATION® of Redmond, Washington, MAC OS® developed by APPLE, INC.® of Cupertino, California, ANDROID™ developed by GOOGLE, INC.® of Mountain View, California, open-source LINUX®, and the like.

Among other programs, the applications 118 include a code notebook 120 that allows a user to analyze source code by submitting various semantic, structural, and/or flow analysis code queries. The code notebook 120 is an executable software application 118 for creating and analyzing program source code. Among other things, the code notebook 120 provides interfaces for code development, data cleaning and transformation, numerical simulation, statistical modeling, data visualization, machine learning, cloud ingestion, and other features for creating and analyzing source code. Though, embodiments are not limited to any particular type of code notebook 120, alternative embodiments use other types of code notebooks 120, such as, for example but without limitation, PyCharm, Apache Zeppelin, Apache Spark Notebook, RSTUDIO®, and the like.

In some embodiments, the code notebook 120 generates a local build 142 of program source code 144 that a user is developing or otherwise has selected to be analyzed. This local build 144 of the source code 144 may be transmitted to a cloud environment discussed below for ingestion by a cloud-based service that provides the ability to perform the queries disclosed herein. Alternatively, the source code 144 may be analyzed and ingested, and a database (e.g., SQL) thereof may be built directly on the client computing device 100. For the sake of clarity, embodiments are discussed in a client-server architecture, where the client computing device 100 transmits either the local build 142 of the source code 144, or the source code itself, to the cloud for ingestion, database building, and the answering of code queries.

The code notebook 120 includes an integrated development environment (IDE) plugin 128 that is capable of reading the source code 144 and interactively scraping data to power visualizations thereof within the code notebook UI 122, specifically within the code representation 134 discussed below. In some embodiments, the IDE plugin 128 is a VISUAL STUDIO® code plugin that provides the ability to display the disclosed query results directly in an editor view (e.g., the code representation) of the source code. The source code 144 is shown visually and interactively in a code representation 134 area of the code notebook UI 122.

The code notebook 120 includes one or more query application programming interfaces (APIs) 126 that allow a user to run queries on the source code 144. The query APIs 126 include various query functions for creating and submitting code queries. In operation, the APIs 126 translate the query functions submitted in a query into database queries. For example, a user may submit a query through a VISUAL STUDIO® IDE using the defined query functions of the APIs 126, and the APIs 126 may then translate those query functions (or the query in its entirety) into a database query language (e.g., SQL) for querying a database created from the source code 144. Thus, in some embodiments, the APIs 126 provide both client-side query functions for creating code queries and backend database functions for actually querying a database generated from the source code 144

The code notebook UI 122 also includes several different UI portions in the form of a bookmark area 130, a query window 132, and a code representation 134. Other embodiments replace the bookmark area 130 by visualizations rendered in the query window 132. As previously mentioned, the code representation 134 shows the actual source code 144 being analyzed. The query window 132 is a UI window that allows the user to submit a code query to run on the source code 144, for example, using the various query functions that are available through the query APIs 126. Again, these query functions allow the user to create and submit a code query comprising any combination of semantic queries 134, structural queries 138, and flow analysis queries 140. Once a code query is submitted, the APIs 126 translate the code query into database queries that may be run on a database of the source code 144. The query APIs 126 provide a set of programmatic functions for the user to specify the code query in the query window 132.

As previously discussed, code queries may specify semantic and structural searches. Additionally, the source code 144 may be analyzed to understand—or machine learn—its program flow operations. These flow operations may be organized in one or more tree structures that designate how variables and operations are interrelated in the source code 144. Some embodiments use these uncovered flow operations to expand the semantic searches beyond just the query text and its semantic equivalence to also include ending other non-semantically equivalent variables and operations that use, depend on, or are otherwise programmatically related to the query text and its semantic equivalence.

Once the query is run on the database of the source code 144, results of the code query are provided to the client computing device 100 and shown directly in the code representation 134. The code representation 134 is a UI window within the code notebook UI 122 that shows the actual source code 144, and that indicates (e.g., through highlighting, bolding, italicizing, changing color, or otherwise visually designating) query results directly in the source code 144. For example, if a user submits a code query searching for all the instances of the variable "settings" that are used in for loops within the source code, the disclosed embodiments may expand that search term out to other semantically equivalent, or synonymous, terms (e.g., configurations, config, options, or the like) that are found in for loops. In another example, the user may submit a code query searching for all sections of the source code that define B-trees or index structures, which may be named many different things, and the disclosed embodiments create a fuzzy search searches for such B-trees or index structures in the code regardless of name. These results to the code queries are indicated in the code representation 134, e.g., through highlighting, bolding, italicizing, changing color or font size, jumping directly to bookmarked portions, or other identifications.

In some embodiments, the code representation 134 also includes an editor that allows the user to directly edit the source code 144. In such embodiments, the code notebook UI 122 provides the user with a single application for querying the source code 144 (using fuzzy logic), viewing results of such code queries, and directly editing the source code 144. The ability to quickly submit and view powerful code queries frequently causes the user to want to change the source code 144 in some manner. They are able to do just that using the editor within the code representation 134. Some embodiments also include an API capable of performing a user's desired edits on all query results, including making on specific code structural contexts. The latter being referred to as "structured editing." For example, the user may first submit a query, and then may want to edit or otherwise augment the source code using the results from the query as the targets of a modification operation.

an API capable of performing the user's desired edits not on individual instances but on ALL query results, is something we envision and are working on. Changing these edits in specific structural contexts is also part of this idea. We call this "structured editing" and see it as another reasonable piece of the "code book" idea: first, you query. Then, you may want to edit or otherwise augment using the matches from your query as the "targets" of said operation.

Along those lines, the bookmark area 130 provides a list of bookmarked portions of the source code where results to code queries are found. For instance, a user may submit a code query, embodiments highlight (or otherwise indicate) the results of the code query in the source code, and the bookmark area provides actionable links that allow the user to jump to the various portions of the source code in the code representation 134 where the results are located. In other embodiments, the bookmarks may also be directly rendered in a visually distinct way in the query window 132. Thus, the code notebook UI 122 provides an integrated tool that allows the user to submit code queries for source code, see the results of those queries in the code representation 130, and jump to different query results using the bookmark area 130.

Several examples of the bookmark area 130, the query window 132, and the code representation 134 are shown in the accompanying UI drawings of FIGS. 4-5 and discussed in the corresponding text below.

Numerous different code searches may be carried out and are far too numerous to describe herein. That said, it should be noted that the disclosed embodiments enable a user to submit semantic queries, structural queries, flow analysis queries, or a combination thereof. Using the disclosed code notebook 120, the user may submit code queries by specifying fuzzy text that may be extrapolated out to identify where such text is located as well as where semantically equivalent, or synonymous text, is located in the source code 144. These fuzzy textual searches may be queries alone or in combination with structural constraints using the disclosed code notebook 122, and may also be expanded based on the discovered program flows in the source code 144. For example, a code query may request specific variables, and their equivalents, that access a SQL query but that are inside of a loop body condition, which is an inefficient way to query a database due to the iterative network demands. Without knowing the structure of the source code 144 around such a SQL query, traditional code-analysis software make such a query impossible to perform. Yet, the disclosed embodiments allow such a query to be submitted using and a combination of structural and flow analysis techniques to identify the instances in the source code 144 where such SQL queries are found within loop conditions, irrespective of code semantics—or based filtered by specific variable names.

Figure 2:
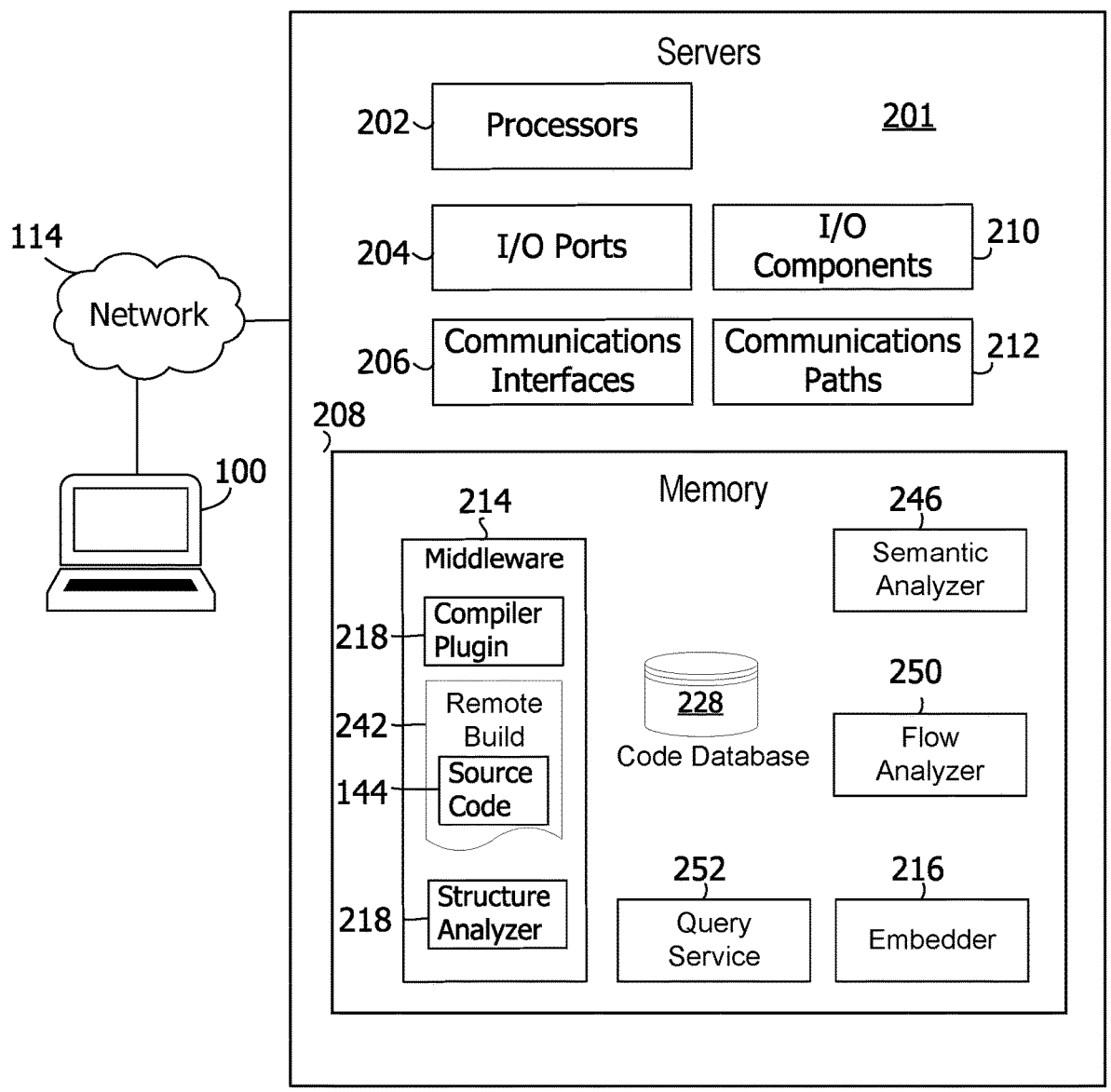
FIG. 2 illustrates a block diagram of a networking environment for operating a cloud service that answers code queries for program source code, according to some of the disclosed embodiments.
Figure 2:
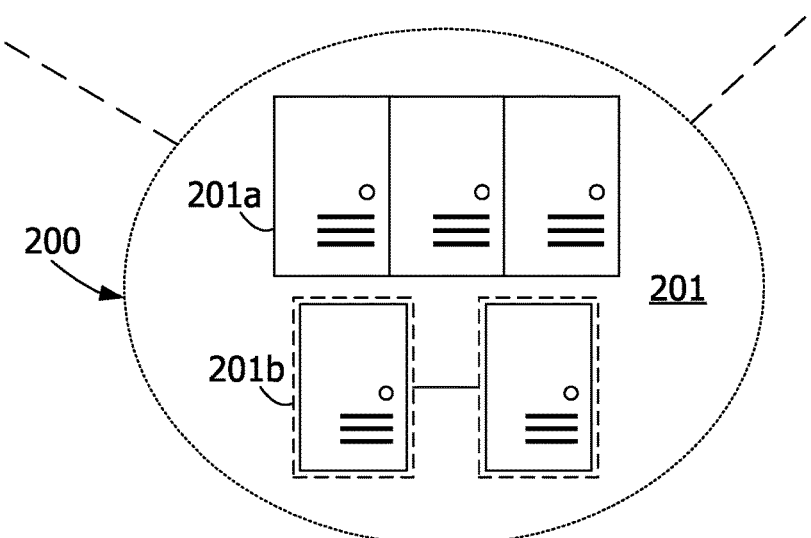
Figure 8:
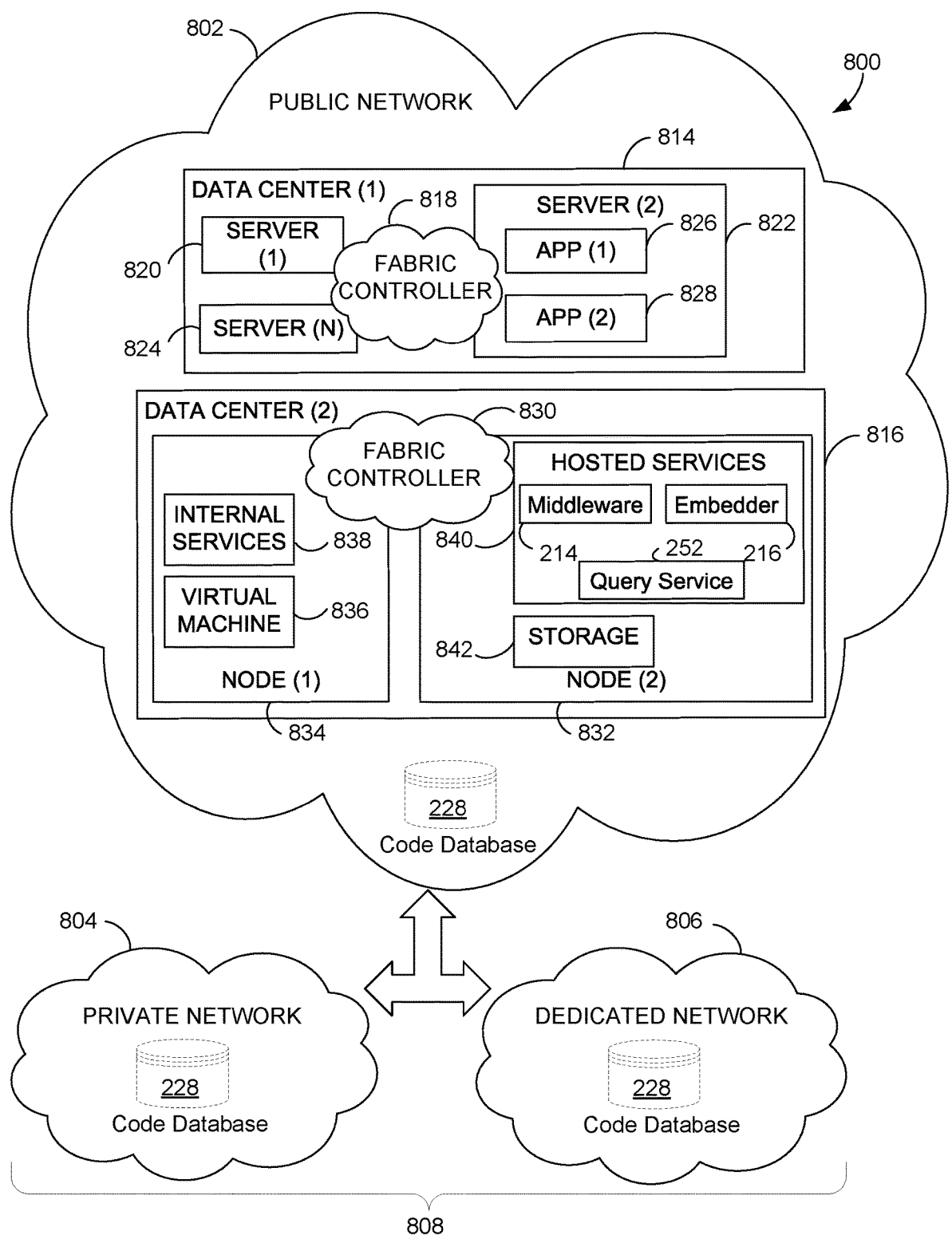
FIG. 8 illustrates a block diagram of an exemplary cloud-computing environment, according to some embodiments.

FIG. 2 illustrates a block diagram of a networking environment for operating a cloud service in a cloud environment 200 that answers code queries for program source code, according to some of the disclosed embodiments. As shown, various client computing devices 100 communicate over a network 114 with a collection of servers 202 that make up the cloud environment 200. The servers 201 may include physical servers 201a, virtual machines (VMs) 201b, or a combination thereof, and may include various dedicated, relational, virtual, private, public, hybrid, or other cloud-based resource. An example server topology for the cloud environment 200 is illustrated in FIG. 8 and discussed in more depth below. One skilled in the art will understand and appreciate that different server topologies may be used to construct the cloud environment 200.

In one instance, tangible hardware elements, or machines, are integral, or operably coupled, to the servers 201a,b to enable each device or VM to perform a variety of processes and operations. Specifically, the servers 201 include or have access to various processors 202, I/O ports 204, communications interfaces 206, computer-storage memory 208, I/O components 210, and communications paths 212. Though not shown, the processors 204 execute a server OS that underlies the execution of software, applications, and computer programs thereon. In particular, the processors 202 employed in the cloud-computing environment 200 may include real or virtual CPUs, GPUs, quantum processors, or the like. While shown as singular block units for clarity, the processors 202, I/O ports 204, communications interfaces 206, computer-storage memory 208, I/O components 210, and communications paths 212 may be located on and executed by different servers 201a and/or VMs 201b.

The memory 208 includes executable instructions for middleware 214, an embedder 216, and a query service 252. Both the middleware 214, the embedder 216, and the query service 252 are executable code instructions that cause the processors 202 to be specifically programmed for building, analyzing, and ingesting a code database 228 of the source code 144. The code database 228 is a database of the compiled and executed source code 144.

The middleware 214 includes a compiler plugin 218 that is a portion of a compiler that parses the source code 144 and generates a remote build 242 of the source code 144. This remote build 242 may then be used to create a code database 228 of the source code 144. In some specific examples, the code database 228 is stored in a relational database management system (RDBMS) and is created from the source code 144—or, more accurately, from the remote build 242 of the source code 144. Ingestion of the source code 144 into the cloud-computing environment 200 involves generating the code database 228 from the source code in the cloud-computing environment 200.

Several sets of instructions cause the processors 202 to identify different key portions of the source code 144 in the code database 228: a semantic analyzer 246, a structure analyzer 248, and a flow analyzer 250. In some embodiments, the structure analyzer 248 is included the middleware 214, and the semantic analyzer 246 and flow analyzer 250 are not. In operation, the semantic analyzer 246 augments the code database 228 by attaching semantic representations to various pieces of data (e.g., variable/subroutine names, string literals, comments, etc.). In some embodiments, such semantic representations denote the semantic equivalencies of synonymous words or phrases. In others, the semantic representations may be vectors (embeddings) made by semantics-focused machine-learning algorithms that analyze textual data across large data sets, such as the World Wide Web or other program source code, to create a latent space in which words or phrases may be embedded. For example, the term "settings" may be deemed to be equivalent with "configurations," "config," "options," or some other semantically similarly term through analyzing respective vectors of text from a collection of online documents or other source code mapped in latent space.

In the latter example, using latent space mappings, machine-learning algorithms convert text to vectors and then compare the proximity of those vectors to other numbers indicative of other text. If the vectors of a particular variable ("settings") are within a numerical threshold of the numbers of another text ("configurations"), the corresponding text of those two vectors are deemed to be semantically equivalent. This latent space is learned by a machine-learning algorithm and, in this space, elements that are "close" (within a threshold distance or degree of separation) are semantically similar.

The compiler plugin 218 parses and identifies the different code structures in the source code 144. For example, if/then, while, for loops; network requests; and as other specific code operations are identified in the source code 144. In some embodiments, these code structures are identified through strict matching rules, e.g., looking for the combination of "for" plus a subsequent operand. Alternatively or additionally, these code structures are learned through a structure-focused machine-learning algorithms that analyze data sets of other code and learn the code operations therefrom. In some embodiments, the compiler plugin 218.

The flow analyzer 250 identifies specific program flows in the program source code 144 from instantiation (variable 1) to subsequent variable (variable 2) through execution of different programming operations. The following provides one example of a program flow that may be identified by the flow analyzer 250, where Variable A is deemed to impact function print(C):

Variable A=12→Variable B=A→Variable C=function(b)→print(C) In another example, suppose a user queried to find instances of the integer literal 1. In this hypothetical embodiment, results are expanded based on program flows (even without the user asking). To do so, the IDE plugin 128 highlighted kValueType=0x01 and kValueTypeForSeek=kValueType because, based on program flows, it was determined that kValueTypeForSeek received a value of '1' (from kValueType).

To provide such program flow analyses, some embodiments use external datalog engines and external, separately defined, datalog analyses that are executable to capture program flow information and augment the code database 228 with that information. In other embodiments, program flows related information (e.g., call graphs, aliasing, points-to information, intervals analysis, etc.) are captured and. Still Other embodiments create tree structures of the various data and operations within the source code 144, thereby providing a structure that may be queried against.

The semantic equivalences, code structures, and program flows that are identified are designated in the code database 228. The middleware 214, the embedder 216, or some other service are configured to insert, append, or otherwise add embeddings to the code database 228 that species these semantic equivalences, code structures, and operational workflows. For instance, variable names that are semantically equivalent may be associated with each other. Code structures of the same type may be associated with each other. Tree structures of program flows may be stored in the code database 228. Together, this rich data enables powerful code queries to be run on the code database 228 that include fuzzy semantic searches combined with strict structure queries and program flows, providing search capabilities that extend far beyond just searching for specific text in the source code 144.

The query service 252 runs the code queries submitted by the user on the code database 228, which, again, is populated with the previously discussed semantic, structure, and flow designations. In some embodiments, these code queries include a combination of the semantic searches and structural queries, and the program flows are added to expand the code queries further to capture data that is programmatically related. In other embodiments, the user requests the program flows be searched in the code queries, along with semantic or structural queries. For example, the user may submit the following code query, "find all integer literals that flow to calls to functions with names like Sleep," which may yield results such as "DelayMicroseconds(1000)." This code query includes both a flow query, a structure query, and a semantic search. While the user may specify semantic and structural portions of a code query, some embodiments automatically analyze such searches in line with previously discovered (or machine learned) program flows of the source code 144; yet, other embodiments, conduct such searching based on flow queries that are submitted by the user—in addition to the semantic and structural searches. The query service 252 is configured to search the code database 228 accordingly and identify query results that answer the code queries. These query results are then communicated to the client computing device 100 where the query results are shown in the code notebook UI 122.

Figure 3:
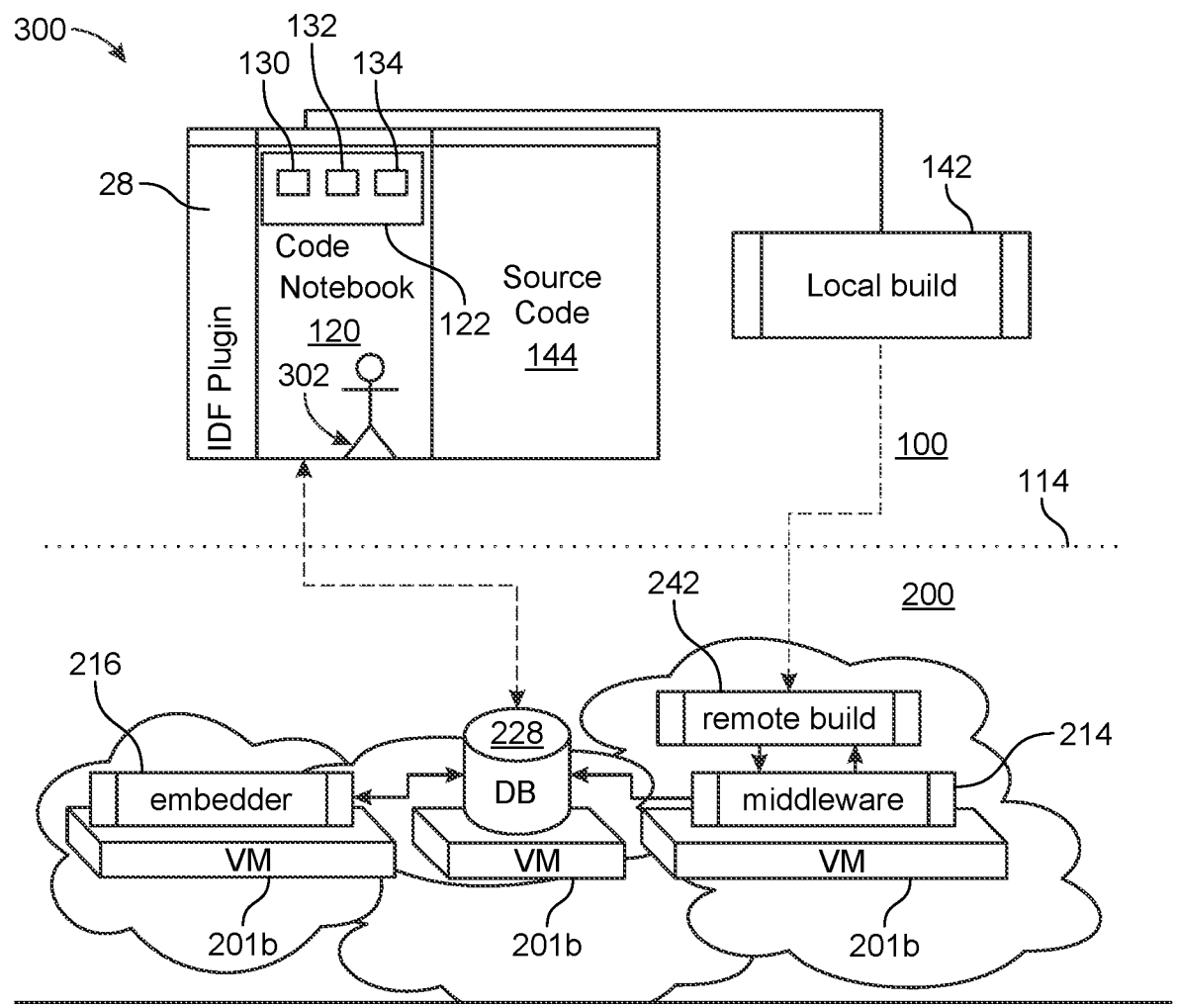
FIG. 3 illustrates a block diagrams of source code being submitted to and built in a cloud-computing environment to create a code database upon which code queries may be submitted, according to some of the disclosed embodiments.

FIG. 3 illustrates a block diagram of the source code 144 being submitted to and built in the cloud-computing environment 200 to create the code database 228 upon which code queries may be submitted, according to some of the disclosed embodiments. Depicted configuration 300 is divided to show portions of the client computing device 100 interacting with the cloud-computing environment 200 across the network 114. As previously discussed, the client computing device 100 includes the code notebook 120. Again, the code notebook 120 comprises the IDE plugin 120, the code notebook UI 122, and (in some embodiments) the source code 144 that is to be uploaded to the cloud-computing environment 200. In particular, the code notebook UI 122 includes the bookmark area 130, the query window 132, and the code representation 134 for a user 302 to interact with the source code 144, submit code queries, and view query results. Looking at the cloud-computing environment 200, the embedder 216, the code database 228, the middleware 214, and the remote build 242 are stored and hosted on three or more VMs 201b. The code database 228, the middleware 214, and the remote build 242 may be hosted by servers 201a, a single VM 201b, or a combination of VMs 201b and servers 201a.

In operation, the local build 142 of the source code 144 is created on the client computing device 100. This local build 142 may include just the source code 144 or a compiled version of the source code 144. The local build 142 is uploaded to the cloud-computing environment 200, where the remote build 242 is generated by the middleware 214. The remote build 242 may be generated after compiling the source code 144—either on the client computing device 100 or by the middleware 214 in the cloud-computing environment 200. The middleware 214 creates the code database 228 from the remote build 242, and the embedder 216 analyzes the code database 228 to identify the semantic equivalences of—or in—the source code 144. Code structures are extracted by the compiler plugin 218. Program flows are extracted by the, in some embodiments, datalog engine of the flow analyzer 250. Various embeddings that specify the learned semantic equivalences, code structures, and program flows are stored in the code database 228, or associated therewith.

Code queries from the user 302 that are submitted through the query window 132 are transmitted to the cloud-computing environment 200. Though not shown for clarity, the query service 252 queries the code database 228 and obtains, or receives, results of the query run on the code database 228 (which, again, is the executed program source code 144). These query results are transmitted back to the cloud computing device 100 where the results may be shown to the user 302 in the representation area 134 of the code notebook UI 122, and the bookmark area 130 may be configured to show bookmarked areas of the source code where the query results are located.

In operation, a user may trigger the remote build 242. of the program source code 144 using a specified back-end cloud service provider. This will, locally, build a Docker image containing the source code 144 code (and encapsulating the desired build processing). In some embodiments, this local image is pushed to an appropriate Docker registry at which point the back-end cloud service provider pulls the newly pushed image to prepare for the remote build 242.

In some embodiments, the back-end provider runs a container using the newly pulled image and, via the compiler plugin 218 embedded in the base image, extracts (with the help of the middleware 214 that listens to several instances of the compiler plugin 218 during concurrent builds) data from the compiler about the target program. In some embodiments, this data is stored in the code database 228. The data captured may be, roughly, a "heap graph" of the compiler during compile time (early on, but after the compiler has built abstract syntax trees (ASTs) for the target.

In some embodiments, the embedder 216 runs on a graphics processing unit (GPU) VM to take target rows and convert them to dense vectors using off-the-shelf models. In some embodiment, such processing focuses on text such a function names, comments, variable names, etc., and off-the-shelf language models (like BERT) are used to generate embeddings. The embeddings are stored in the code database 228, often with the help of a cube extension.

Several Datalog-based program analyses are run using the data in code database 228. This may include things like computing aliasing information, flow edges, building a call graph, etc.

Back in the code notebook 120, a user may execute cells with queries composed using the query API 126. When cells in the notebook 120 are executed, some embodiments use a custom kernel and VISUAL STUDIO® Code extension to support things like rendering specialized (and interactive) output. The interactive output rendering is used, initially, for things like setup and configuration and also later during querying to render clickable results that jump to relevant locations in the target code base. Results are shown directly in the code representation 134 of the program source code 144 (e.g., highlighting, bolding, italicizing, underlining, changing color, or otherwise indicating source ranges or rendering other in-line elements.

Figure 4:
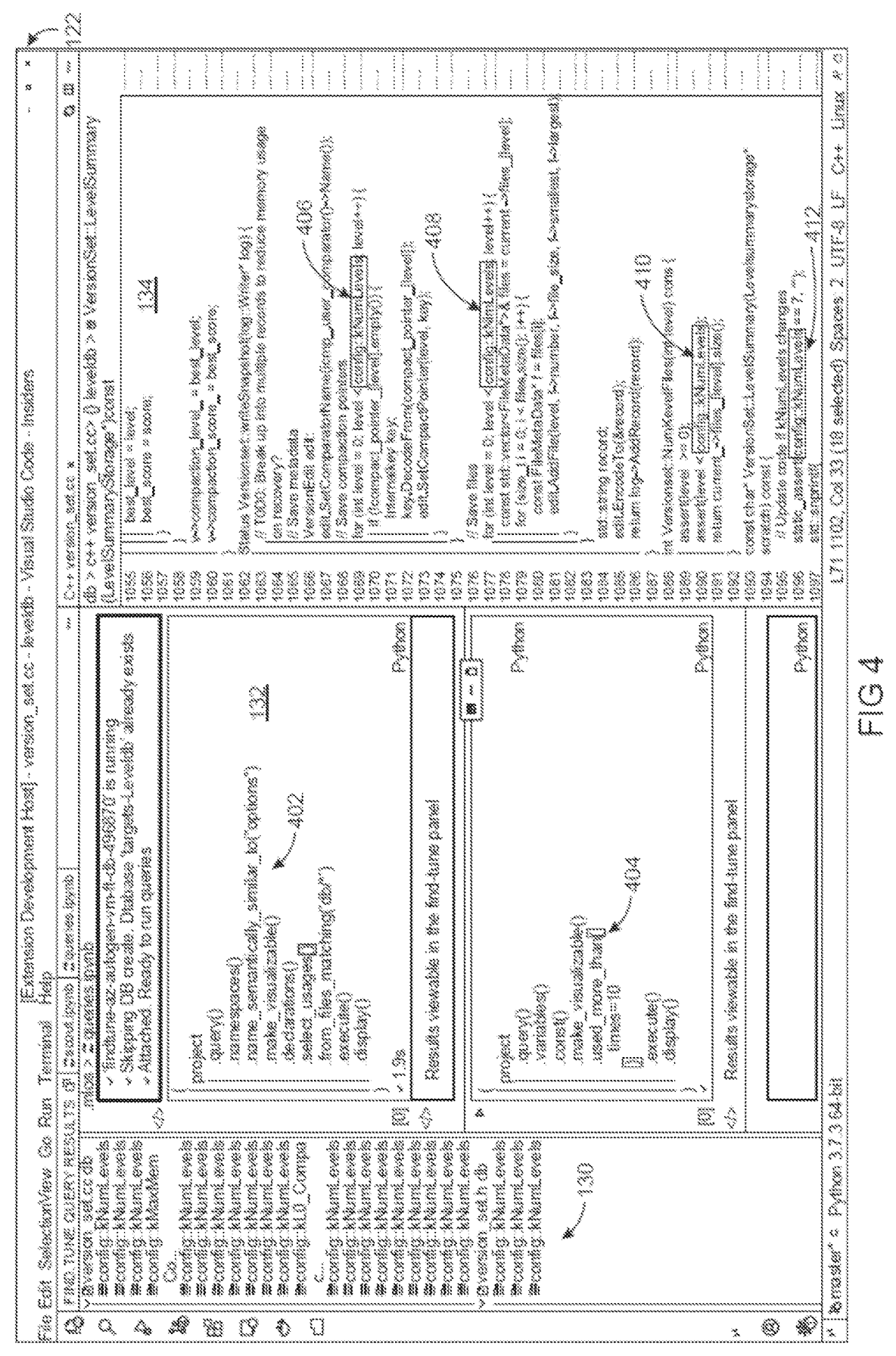

FIG. 4 illustrates an example of the code notebook UI 122 for submitting code queries and viewing query results, according to some of the disclosed embodiments. The code notebook UI 122 displays the bookmark are 130, the query window 132, and the code representation 134. The query window 132 provides an area for the user 302 to submit code queries for testing the source code 144. As previously discussed, the code queries submitted through the query window 132 are transmitted and queried against the code database 228 created from the remote build 242 of the source code 144. Query results are transmitted back to the client computing device 100 and shown in the code representation 134, e.g., through highlighting, italicizing, color changing, or otherwise being visually modified. Also, the bookmark area 130 provides links for the user 302 to jump directly to the various query results that are returned.

FIG. 4 shows the notebook 122 with different queries being run, according to some of the disclosed examples. Query 402 is a semantic search tor variables that are semantically similar to "options." Query 404 is a structural query for variables that are used more than ten times in the source code.

Query results are returned and instances of the query results are highlighted in the code representation 134, at points 406, 408, 410, and 412. As can be seen, the term "config" was identified as being semantically equivalent to "settings" (meeting the semantic query) in response to query 402. Query 402 looked for a namespace like "settings," and (though not shown) results were returned that identified namespace "config," broken down into the declarations defined within that namespace, and then found all usages of the declarations in the namespace with a name similar to settings. These instances 406-412 show the user 302 the query results in the code representation 134, and each instance (in some embodiments) is bookmarked in the bookmark area 130 for easy access. Thus, the user 302 submits a query of semantic, structural, and/or program flow operations, is able to view the query results directly in the source code 144 and is also provided bookmark links to quickly jump to the various query results.

The user 302 may query the source code 144—via the code database 228—with only semantic queries, only structural queries, or only flow queries. In particular, the semantic queries allow the user to only submit fuzzy logic of terms to be searched, and the disclosed embodiments semantically expand the submitted terms to find other text that is considered synonymous, or semantically equivalent.

Thus, the code notebook UI 122 provides an interactive notebook experience that allows the user 302 to submit code queries and get code results directly in the code representation 134. In some embodiments, the code representation 134 also provides editing functionality, allowing the user 302 to directly edit the source code 144. This ability to intelligently search, find, and directly edit the source code 144 is far more helpful to a developer compared to traditional tools for code analysis.

Figure 5A:
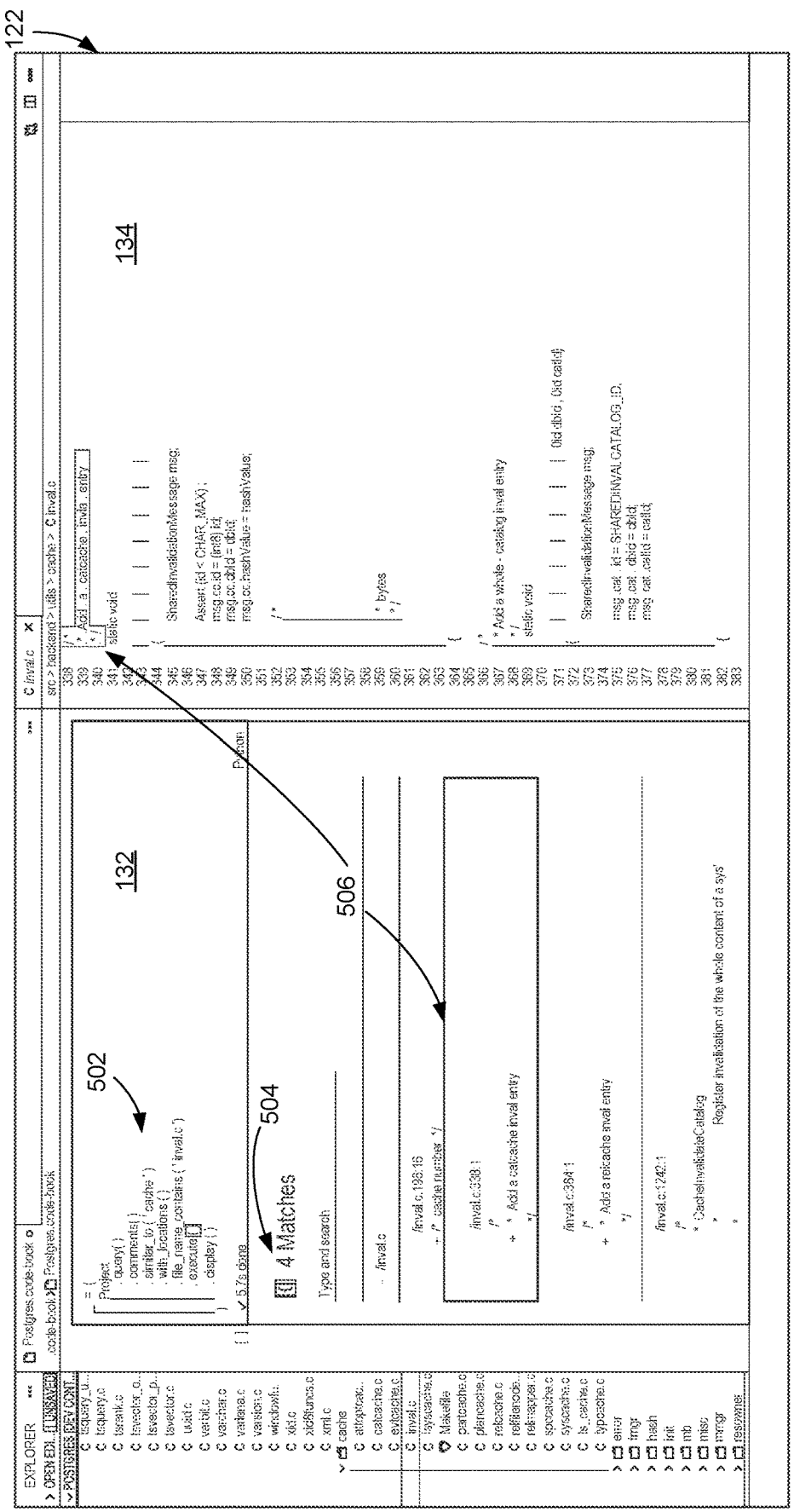
FIG. 5A illustrates a UI of a code notebook being used for submitting code queries and viewing query results, according to some of the disclosed embodiments.
Figure 5B:
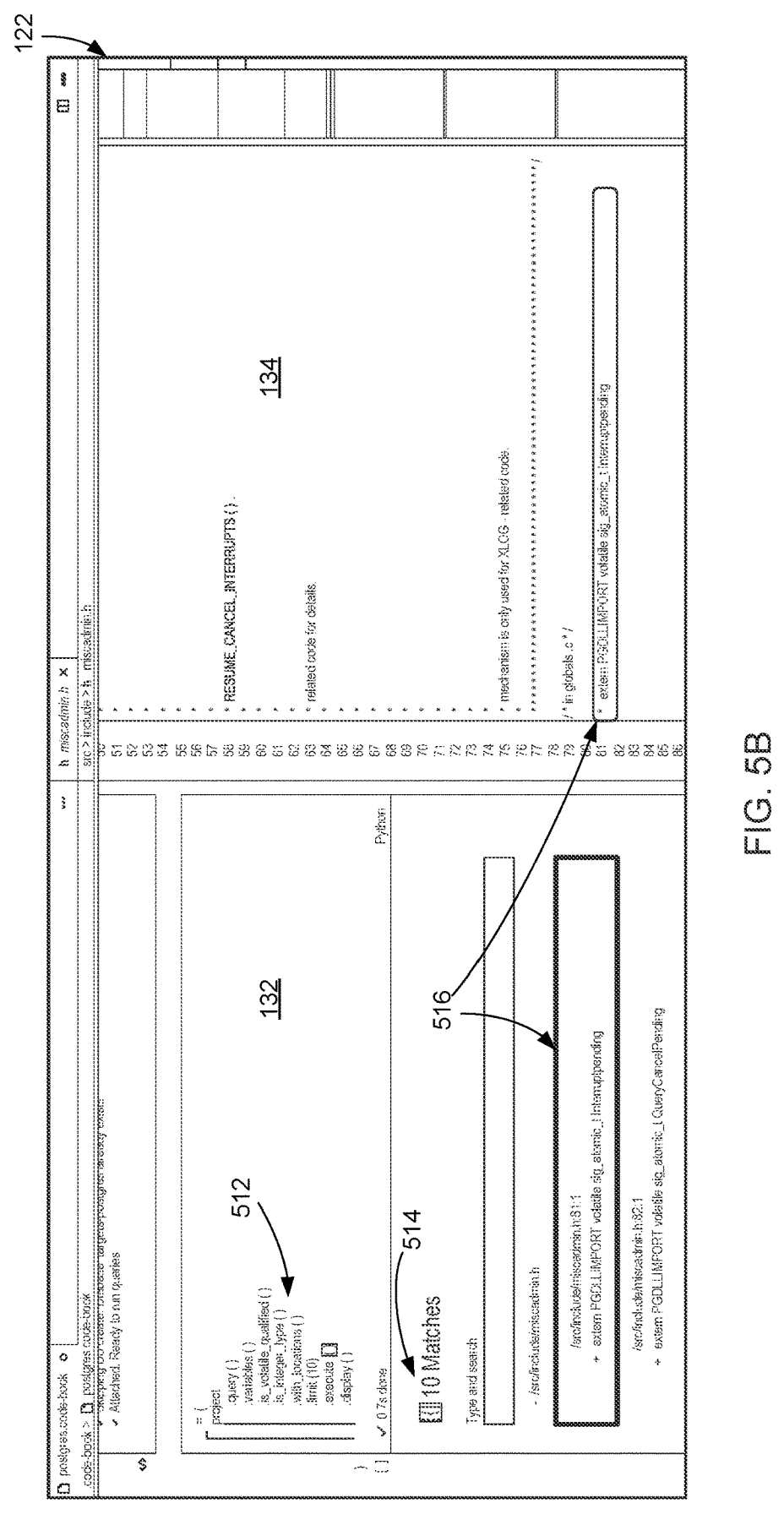
Figure 5C:
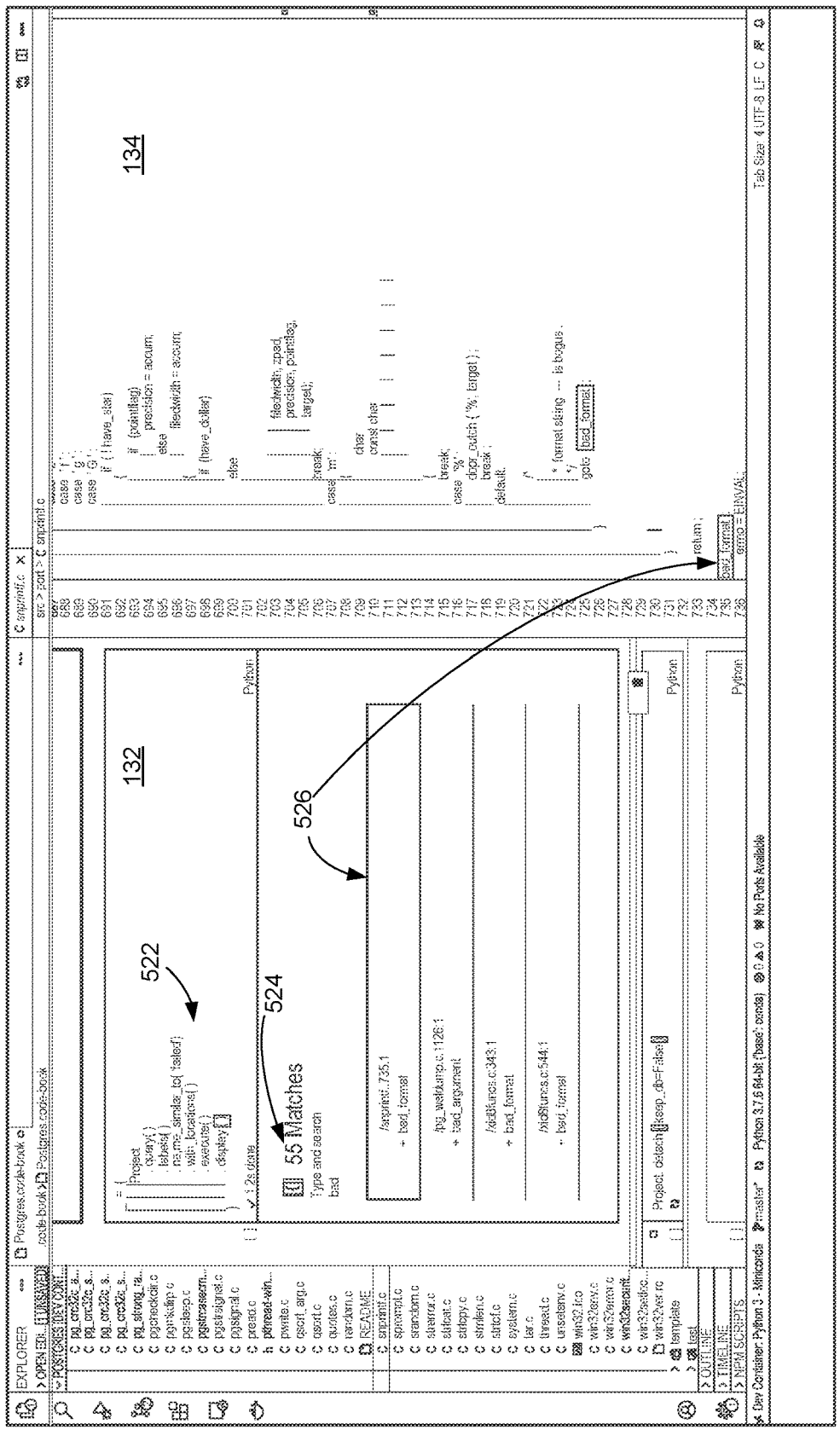
FIG. 5C illustrates a UI of a code notebook being used for submitting code queries and viewing query results, according to some of the disclosed embodiments.

FIGS. 5A-5C illustrate UIs of other embodiments of the code notebook UI 122. In the depicted examples, the code notebook UI 122 shows a counter value 502 that indicates how many code results are found in the code database 228 for a give code query. Looking at FIG. 5A, the user submitted a code query 502 for code elements similar to "cache" with file names that contain "inval.c." Counter value 504 reveals that 55 results were returned, and the results 506 are shown and emphasized in both the query window 132 and the data representation 134. Similar code searches 512 and 522 are shown in FIGS. 5B and 5C, respectively. Respective counter values 514 and 524 and code results 516 and 526 are illustrated as well.

Figure 6:
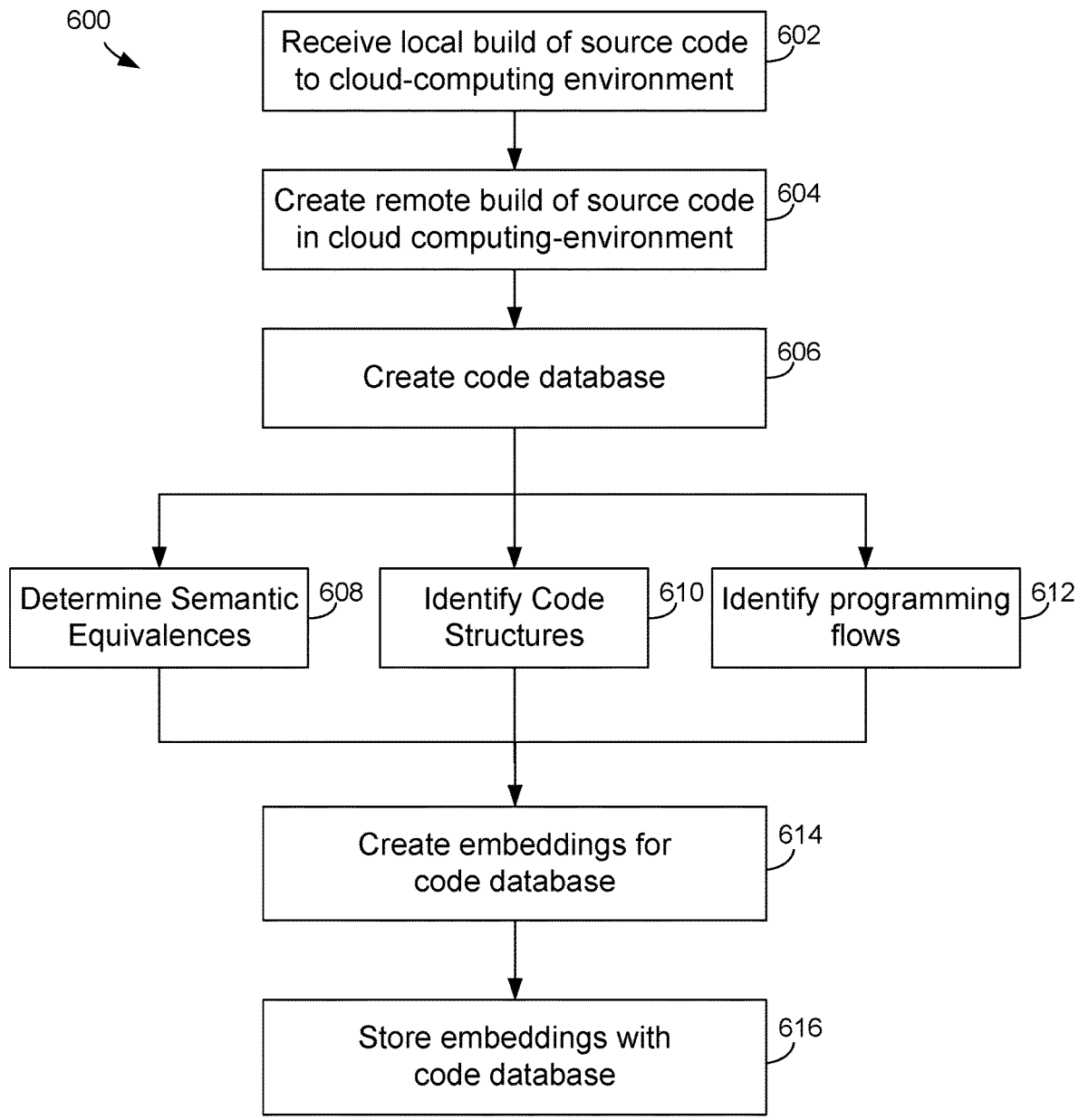
FIG. 6 illustrates a flowchart diagram of a workflow for creating a code database for source code in a cloud-computing environment against which user may run powerful code queries, according to some of the disclosed examples.

FIG. 6 illustrates a flowchart diagram of a workflow 600 for creating the code database 228 of the source code 144, according to some of the disclosed examples. As shown at 602, the local build 142 of the source code 144 is received in the cloud-computing environment 200 from the client computing device 100. The user 302 may upload the local build 142 of the source code 144 to the cloud-computing environment 200, either directly through the code notebook 120 or through an online service for code ingestion. The cloud-computing environment 200 has one or more servers or VMs that are configured to create the remote build 242 of the source code 144, as shown at 604. The middleware 214 creates the code database 228 from the remote build 242, as shown at 606. Alternatively, the code database 228 may be created until after the remote build 242 has been analyzed for semantic equivalences, code structures, and flow operations. In other words operation 606 may be performed after the depicted decision boxes 608-612.

As shown at 608-612, that the source code 144—via the remote build 242 or the code database 228—is analyzed to identify semantic equivalences, code structures, and program flows. In other words, the semantic analyzer 246, structure analyzer 248, and flow analyzer 250 are run to examine and identify the structure, flow, and equivalent text of the source code 144. Workflow 600 shows one embodiment in which these three operations—identification of semantic equivalences by the semantic analyzer 608, code structures by the structure analyzer 612, and flow operations by the flow analyzer 612—are performed in parallel. Alternatively, they may be sequentially performed.

Embeddings are created for the semantic equivalences, code structures, and flow operations that are identified, as shown at 614. Such embeddings of the semantic equivalences, code structures, and flow operations are stored in the code database 228, as shown at 616. Thus, the code database 228 includes a searchable database (e.g., SQL) with the machine learned semantic equivalences, code structures, and flow operations identified against which the user 302 may run powerful code queries.

Figure 7:
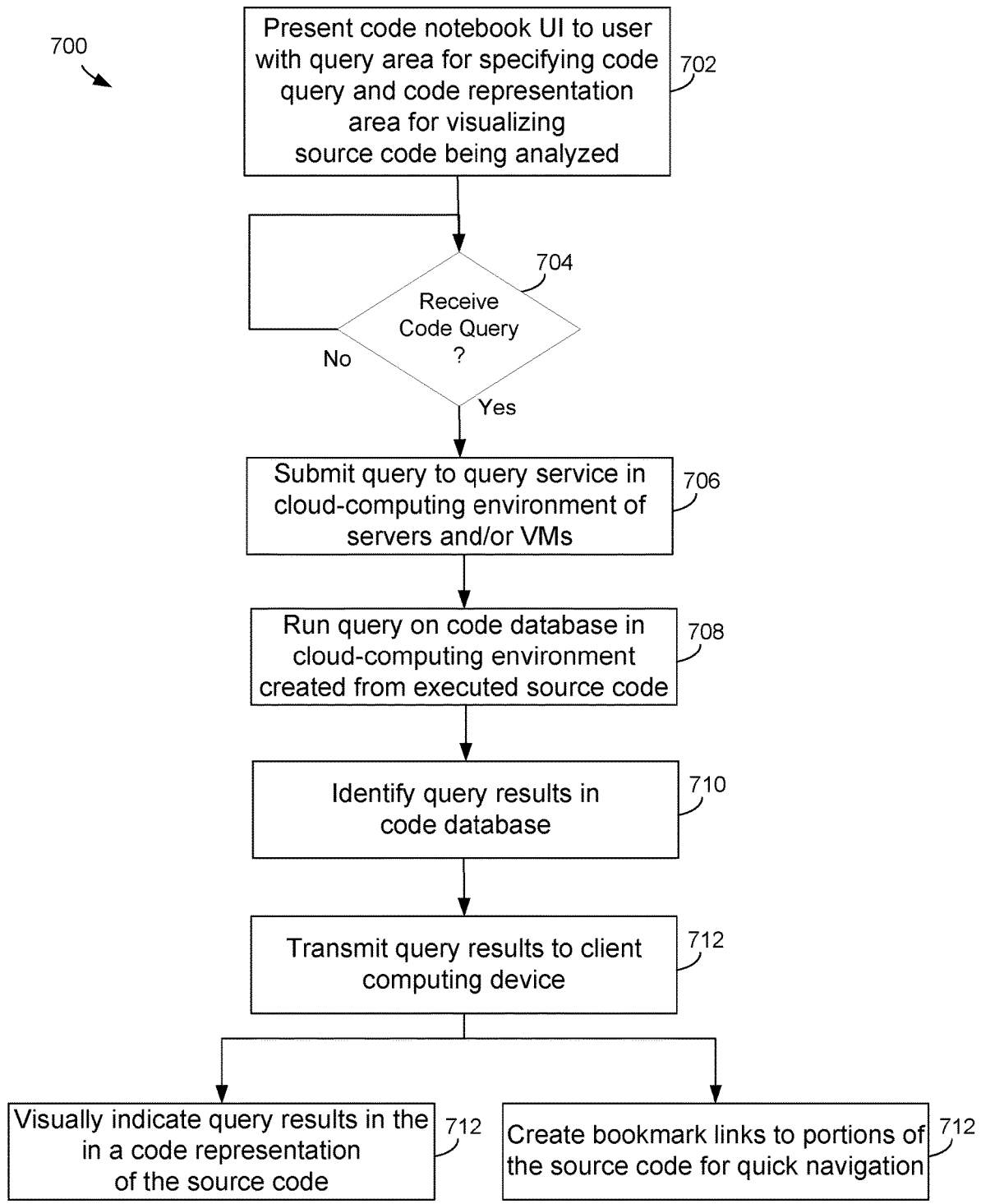
FIG. 7 illustrates a flowchart diagram of a workflow for executing a code notebook on a client computing device that allows a user to submit powerful code queries on source code and view query results directly in the source code, according to some of the disclosed embodiments.

FIG. 7 illustrates a flowchart diagram of a workflow 700 for executing the code notebook 120 on the client computing device 100 that allows the user 302 to submit powerful code queries on the source code 144 and view query results directly in the source code 144, according to some of the disclosed embodiments. As shown at 702, the code notebook UI 122 is presented to the user 302 on the client computing device 100. As shown at 704, the user 302 may submit a code query in the query window 132, specifying any combination of semantic, code structure, and/or operation flow search terms. When a code query is entered and submitted in the query window 132, the code query is submitted to the query service 252 operating on the servers or VMs of the cloud-computing environment 200, as shown at 706. The query service 252 runs the submitted query on the code database 228, as shown at 708. Query results are identified, as shown at 710, as transmitted back to the client computing device 110, as shown at 712.

The code notebook 120 visually indicates (e.g., highlighting, bolding, changing color) the query results in the code representation 134 of the source code 144 to make the query results apparent to the user 302, as shown at 712. Additionally, bookmarks links are generated and presented in the bookmark area 130 of the code notebook UI 122 to allow the user 302 to quickly jump to different query results in the source code, as shown at 712.

Thus, the code notebook UI 122 provides an area to submit queries (query window 132), view query results directly in the source code (code representation 134), and jump to different query results in the source code 144 (bookmark area 130). Combined with the ability to submit powerful code queries that analyze the source code with fuzzy logic, the disclosed embodiments provide a robust code-analysis tool that allows for queries for more generalized searches to be conducted and expanded by backend machine learning while at the same time enabling a user to quickly search for and view code query results directly in a single client-side application.

Example Cloud-Computing Environment

FIG. 8 illustrates a block diagram of one example of a cloud-computing environment 800, in accordance with some of the disclosed embodiments. Cloud-computing environment 800 includes a public network 802, a private network 804, and a dedicated network 806. Public network 802 may be a public cloud-based network of computing resources, for example. Private network 804 may be a private enterprise network or private cloud-based network of computing resources. And dedicated network 806 may be a third-party network or dedicated cloud-based network of computing resources.

Hybrid cloud 808 may include any combination of public network 802, private network 804, and dedicated network 806. For example, dedicated network 806 may be optional, with hybrid cloud 808 comprised of public network 802 and private network 804.

Public network 802 may include data centers configured to host and support operations, including tasks of a distributed application, according to the fabric controller 818. It will be understood and appreciated that data center 814 and data center 816 shown in FIG. 8 are merely examples of suitable implementations for accommodating one or more distributed applications, and are not intended to suggest any limitation as to the scope of use or functionality of examples disclosed herein. Neither should data center 814 and data center 816 be interpreted as having any dependency or requirement related to any single resource, combination of resources, combination of servers (e.g., servers 820 and 824) combination of nodes (e.g., nodes 832 and 834), or a set of application programming interfaces (APIs) to access the resources, servers, and/or nodes.

Data center 814 illustrates a data center comprising a plurality of servers, such as servers 820 and 824. A fabric controller 818 is responsible for automatically managing the servers 820 and 824 and distributing tasks and other resources within the data center 814. By way of example, the fabric controller 818 may rely on a service model (e.g., designed by a customer that owns the distributed application) to provide guidance on how, where, and when to configure server 822 and how, where, and when to place application 826 and application 828 thereon. One or more role instances of a distributed application may be placed on one or more of the servers 820 and 824 of data center 814, where the one or more role instances may represent the portions of software, component programs, or instances of roles that participate in the distributed application. In other examples, one or more of the role instances may represent stored data that are accessible to the distributed application.

Data center 816 illustrates a data center comprising a plurality of nodes, such as node 832 and node 834. One or more virtual machines may run on nodes of data center 816, such as virtual machine 836 of node 834 for example. Although FIG. 8 depicts a single virtual node on a single node of data center 816, any number of virtual nodes may be implemented on any number of nodes of the data center in accordance with illustrative embodiments of the disclosure. Generally, virtual machine 836 is allocated to role instances of a distributed application, or service application, based on demands (e.g., amount of processing load) placed on the distributed application. As used herein, the phrase "virtual machine," or VM, is not meant to be limiting, and may refer to any software, application, operating system, or program that is executed by a processing unit to underlie the functionality of the role instances allocated thereto. Further, the VMs 836 may include processing capacity, storage locations, and other assets within the data center 816 to properly support the allocated role instances.

In operation, the virtual machines are dynamically assigned resources on a first node and second node of the data center, and endpoints (e.g., the role instances) are dynamically placed on the virtual machines to satisfy the current processing load. In one instance, a fabric controller 830 is responsible for automatically managing the virtual machines running on the nodes of data center 816 and for placing the role instances and other resources (e.g., software components) within the data center 816. By way of example, the fabric controller 830 may rely on a service model (e.g., designed by a customer that owns the service application) to provide guidance on how, where, and when to configure the virtual machines, such as VM 836, and how, where, and when to place the role instances thereon.

As described above, the virtual machines may be dynamically established and configured within one or more nodes of a data center. As illustrated herein, node 832 and node 834 may be any form of computing devices, such as, for example, a personal computer, a desktop computer, a laptop computer, a mobile device, a consumer electronic device, a server, and like. VMs machine(s) 836, while simultaneously hosting other virtual machines carved out for supporting other tenants of the data center 816, such as internal services 838, hosted services 840, and storage 842. Often, the role instances may include endpoints of distinct service applications owned by different customers.

In some embodiments, the hosted services 840 include the previously discussed middleware 214, the embedder 216, and the query service 252. These services operate to create, maintain, and query the code database 228, which may be stored and hosted in the public network 802, the private network 804, or the dedicated network 806, as well as any combination thereof.

Typically, each of the nodes include, or is linked to, some form of a computing unit (e.g., central processing unit, microprocessor, etc.) to support operations of the component(s) running thereon. As utilized herein, the phrase "computing unit" generally refers to a dedicated computing device with processing power and storage memory, which supports operating software that underlies the execution of software, applications, and computer programs thereon. In one instance, the computing unit is configured with tangible hardware elements, or machines, that are integral, or operably coupled, to the nodes to enable each device to perform a variety of processes and operations. In another instance, the computing unit may encompass a processor (not shown) coupled to the computer-readable medium (e.g., computer storage media and communication media) accommodated by each of the nodes.

The role of instances that reside on the nodes may be to support operation of service applications, and thus they may be interconnected via APIs. In one instance, one or more of these interconnections may be established via a network cloud, such as public network 802. The network cloud serves to interconnect resources, such as the role instances, which may be distributed across various physical hosts, such as nodes 832 and 834. In addition, the network cloud facilitates communication over channels connecting the role instances of the service applications running in the data center 816. By way of example, the network cloud may include, without limitation, one or more communication networks, such as LANs and/or wide area networks WANs. Such communication networks are commonplace in offices, enterprise-wide computer networks, intranets, and the Internet, and therefore need not be discussed at length herein.

The examples and embodiments disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, servers, VMs, specialty computing devices, etc. The disclosed examples may also be practiced in distributed computing environments where tasks are performed by remote-processing devices that are linked through a communications network.

Examples of the disclosure may be described in the general context of computer-executable instructions, such as program modules, executed by one or more computers or other devices in software, firmware, hardware, or a combination thereof The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media devices and communication media. Computer storage media devices include volatile and nonvolatile, removable and non-removable memory implemented in any method or technology for storage of information such as computer readable instructions, data structures, program modules, or the like. Computer storage media devices are tangible and mutually exclusive to communication media. Computer storage media devices are implemented in hardware and exclude carrier waves and propagated signals. Computer storage media devices for purposes of this disclosure are not signals per se. Example computer storage media devices include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media typically embody computer readable instructions, data structures, program modules, or the like in a modulated data signal such as a carrier wave or other transport mechanism and include any information delivery media.

Additional Embodiments

Some embodiments are directed to a method for presenting a code notebook that allows a user to enter a code query regarding program source code that is executed in a cloud-computing environment and see query results to the code query. The method comprises: presenting a UI of the code notebook on a client computing device, the UI comprising a query window for receiving the code query from the user and a representation of the program source code modified based on the query results; receiving the code query from the user in the query window; submitting the code query to one or more servers of the cloud-computing environment for running the code query on the program source code in the cloud-computing environment to generate the query results; receiving the query results generated from the one or more servers querying the program source code; and showing at least one of the query results in the representation of the program source code in the user interface (UI) of the code notebook on a client computing device.

In some embodiments, the code query comprises a first code element requested for searching and the at least one of the query results comprise a second code element determined to be semantically equivalent to the first code element of the code query.

Some embodiments also include determining the second code element is semantically equivalent to the first code element by applying a machine-learning algorithm that analyzes sets of text on the World Wide Web.

Some embodiments also include providing one or more application programming interfaces (APIs) as part of the code notebook for enabling the user to have the code query run by the one or more servers.

In some embodiments, wherein the query results in the representation of the program source code comprises are highlighted, bolded, italicized, underlined, or changed in color.

Some embodiments also include displaying one or more bookmark links to the query results in the representation of the program source code presented in the UI of the code notebook on the client computing device.

Some embodiments also include generating a local build of the program source code for transmission to the one or more server. Other embodiments do not need the full build, and only transfer the structured data, not the object files.

Some embodiments also include receiving the program source code at the one or more servers and generating a remote build of the program source code on the one or more servers; and creating a code database of the program source code from the remote build.

Some embodiments also include creating a code database of the program source code on the one or more servers; analyzing text of the program source code; identifying semantic equivalences of the analyzed text in the program source code; creating embeddings to add to the code database indicative of the semantic equivalences of the analyzed text; and storing the embeddings in the code database.

Some embodiments also include receiving the code query at the one or more servers; querying the code database with the code query; identifying at least one different text of the program source code that is semantically equivalent to text of the code query based on the embeddings stored in the code database; and including the at least one different text of the source code.

Some embodiments also include creating a code database of the program source code on the one or more servers; identifying structural code elements in the program source code; creating embeddings to add to the code database indicative of the structural code elements; and storing the embeddings in the code database.

Some embodiments also include receiving the code query at the one or more servers; querying the code database with the code query; identifying at least one of the structural code elements in the program source code from the code database; and including the at least one of the structural code elements in the query results.

In some embodiments, the code query specifies a structural search for a particular code structure and a semantic search for particular code text.

In some embodiments, the code query specifies a structural search for a particular operational workflow and a semantic search for particular code text.

In some embodiments, the query results comprise at least one semantic equivalent of text in the code query identified in at least one code structural element of the program source code.

Other embodiments are directed to a client computing device configured to present a code notebook that allows a user to enter a code query regarding program source code and see query results of the code query in a representation of the program source code. The client computing device comprises: memory embodied with executable instructions for presenting a user interface (UI) of the code notebook, the UI comprising a query window for receiving the query from the user and the representation of the program source code modified based on the results to the query; and at least one processor programmed to: present the UI of the code notebook, receive the code query from the user in the query window, submit the query to one or more servers for running the query on the program source code in a cloud-computing environment to generate the query results; receive the query results from the one or more servers, and show at least one of the results in the representation of the program source code in the UI of the code notebook, wherein the query results include at least one code variable that differs from the one or more code variables of the code query and that was deemed to be semantically equivalent by the one or more servers.

In some embodiments, the code query comprises a first code element requested for searching and the at least one of the query results comprise a second code element determined to be semantically equivalent to the first code element of the code query.

In some embodiments, the code query comprises a request to search for the first code element, or any code element, in a code structural element, and the query results comprise identification of the second code element within the code structural element in the program source code.

Other embodiments are directed to a method for performing operations to ingest program source code into a cloud-computing environment and querying the program source code in response to code queries received from a client computing device. The operations comprise: receiving the program source code from a client computing device; analyzing the program source code to identify semantically equivalent text and code structural elements in the program source code; creating a code database of the program source code; creating one or more embeddings for the code database indicative of the identified semantically equivalent text and the code structural elements in the program source code; and storing the one or more embeddings with the code database for use in querying the program source code.

Some embodiments also include: receiving a code query submitted by a user, the code query requesting a search for a first code element; querying the code database for the code query; identifying, from the embeddings, that the first code element of the code query is semantically equivalent to a second code element that is not indicated in the code query; and providing the second code element as a query result to the client computing device.

While the aspects of the disclosure have been described in terms of various examples with their associated operations, a person skilled in the art would appreciate that a combination of operations from any number of different examples is also within scope of the aspects of the disclosure.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method comprising:
    presenting a user interface (UI) of a code notebook, the UI comprising a query window with a representation of a program source code;
    receiving a code query from a user in the query window, the code query including a code variable;
    converting the code variable into a first vector, wherein the first vector is used to identify a latent space of vectors;
    comparing a proximity of the first vector of the code variable to a second vector indicative of text different from the code variable;
    receiving a query result that is semantically equivalent to the code query based on the comparison and also the latent space of vectors, wherein the latent space of vectors is indicative of a threshold proximity of the code query to the query result in the program source code; and
    showing the query result in the representation of the program source code in the UI of the code notebook.

2. The method of claim 1, further comprising:
    based on the comparison, identifying the latent space of vectors in the program source code.

3. The method of claim 1, further comprising:
    the query result being received from a machine learning service;
    the comparing the proximity of the first vector of the code variable to the second vector using at least the machine learning service; and
    the latent space of vectors being associated with the code variable.

4. The method of claim 1, further comprising:
    creating a bookmark link, associated with the query result, to a different portion of the program source code.

5. The method of claim 4, further comprising:
    displaying the bookmark link in a bookmark area of the UI to navigate to the different portion of the program source code.

6. The method of claim 1, further comprising:
    analyzing the program source code to machine learn a program flow in the program source code; and
    expanding the code query to include a non-semantically equivalent variable and an operation that are programmatically related to the code query.

7. The method of claim 1, further comprising:
translating the code query into a database query; and
running the database query on a database of the program source code.

8. A computing system comprising:
a memory embodied with executable instructions for presenting a user interface (UI) of a code notebook, the UI comprising a query window with a representation of a program source code; and
a processor programmed to:
receive a code query from a user in the query window, the code query including a first code variable;
receive, from a machine learning service, a query result that:
(1) is semantically equivalent to the code query based on a latent space of vectors, wherein the latent space of vectors, associated with the first code variable, is indicative of a threshold proximity of the code query to the query result in the program source code,
(2) includes a second code variable that is non-semantically equivalent to the first code variable, and an operation that is programmatically related to the code query, the operation based on a machine learned program flow in the program source code; and
show the query result in the representation of the program source code in the UI of the code notebook.

9. The computing system of claim 8, wherein the processor is further programmed to:
convert the first code variable into a first vector, wherein the first vector is used to identify the latent space of vectors.

10. The computing system of claim 9, wherein the processor is further programmed to:
compare, by the machine learning service, a proximity of the first vector of the first code variable to a second vector indicative of text different from the first code variable; and
based on the comparison, identify the latent space of vectors in the program source code.

11. The computing system of claim 8, wherein the processor is further programmed to:
create a bookmark link, associated with the query result, to a different portion of the program source code.

12. The computing system of claim 11, wherein the processor is further programmed to:
display the bookmark link in a bookmark area of the UI to navigate to the different portion of the program source code.

13. The computing system of claim 8, wherein the processor is further programmed to:
analyze the program source code to machine learn the program flow in the program source code; and
expand the code query to include the second code variable and the operation that are programmatically related to the code query.

14. The computing system of claim 8, wherein the processor is further programmed to:
translate the code query into a database query; and
run the database query on a database of the program source code.

15. A computer-storage medium storing executable instructions that upon execution by a processor perform a method comprising:
presenting a user interface (UI) of a code notebook, the UI comprising a query window with a representation of a program source code;
receiving a code query from a user in the query window, the code query including a code variable;
converting the code variable into a first vector, wherein the first vector is used to identify a latent space of vectors;
comparing a proximity of the first vector of the code variable to a second vector indicative of text different from the code variable;
receiving a query result that is semantically equivalent to the code query based on the comparison and also the latent space of vectors, wherein the latent space of vectors is indicative of a threshold proximity of the code query to the query result in the program source code; and
showing the query result in the representation of the program source code in the UI of the code notebook.

16. The computer-storage medium of claim 15, further storing executable instructions that upon execution by the processor perform the method comprising:
based on the comparison, identifying the latent space of vectors in the program source code.

17. The computer-storage medium of claim 15, further storing executable instructions that upon execution by the processor perform the method further comprising:
the query result being received from a machine learning service;
the comparing the proximity of the first vector of the code variable to the second vector using at least the machine learning service; and
the latent space of vectors being associated with the code variable.

18. The computer-storage medium of claim 15, further storing executable instructions that upon execution by the processor perform the method comprising:
creating a bookmark link, associated with the query result, to a different portion of the program source code.

19. The computer-storage medium of claim 18, further storing executable instructions that upon execution by the processor perform the method comprising:
displaying the bookmark link in a bookmark area of the UI to navigate to the different portion of the program source code.

20. The computer-storage medium of claim 15, further storing executable instructions that upon execution by the processor perform the method comprising:
analyzing the program source code to machine learn a program flow in the program source code; and
expanding the code query to include a non-semantically equivalent variable and an operation that are programmatically related to the code query.

* * * * *